United States Patent [19]

Abe et al.

[11] Patent Number: 4,643,223

[45] Date of Patent: Feb. 17, 1987

[54] SOLENOID VALVE

[75] Inventors: Tatsuhiko Abe; Nobukazu Takagi, both of Higashimasyuyama, Japan

[73] Assignee: Diesel Kiki Co., Ltd., Tokyo, Japan

[21] Appl. No.: 829,255

[22] Filed: Feb. 14, 1986

[30] Foreign Application Priority Data

Feb. 27, 1985 [JP] Japan .............................. 60-26495[U]

[51] Int. Cl.[4] ........................ F16K 37/00; F16K 31/06

[52] U.S. Cl. ................................ 137/554; 251/129.16; 251/129.06; 251/368; 137/375

[58] Field of Search ............................... 137/554, 375; 251/129.16, 129.06, 368

[56] References Cited

U.S. PATENT DOCUMENTS

| | | | |
|---|---|---|---|
| 4,043,351 | 8/1977 | Durling | 137/554 |
| 4,111,178 | 9/1978 | Casey . | |
| 4,341,241 | 7/1982 | Baker | 137/554 |

*Primary Examiner*—Arnold Rosenthal
*Attorney, Agent, or Firm*—James C. Wray

[57] ABSTRACT

In a solenoid valve with ON/OFF switch arranged by a valve member and the associated valve seat defined in an electrically conductive body, the solenoid valve has a stopper connected to the valve member for setting the stroke of the valve member and comes in contact with the body when an actuator for driving the valve member is in its de-energized state and an electrically insulating sheet provided between the stopper and the body so as to prevent the valve member for coming in contact with the body through the stopper.

8 Claims, 3 Drawing Figures

FIG. 1
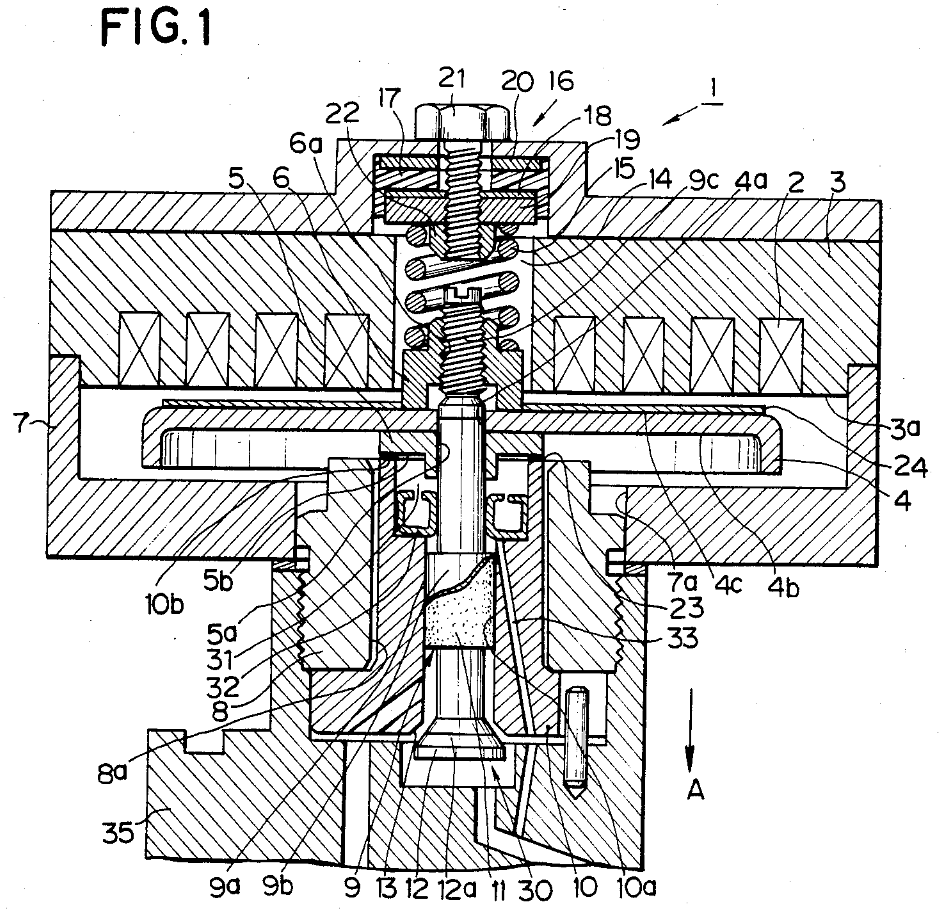
FIG. 2A
FIG. 2B
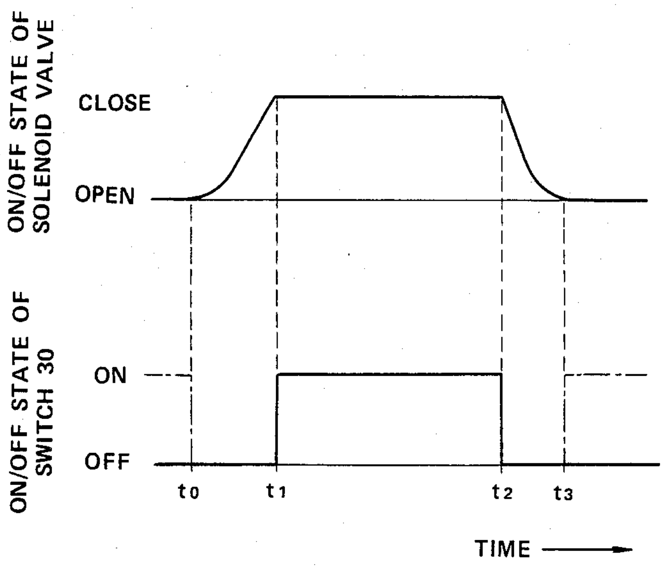

SOLENOID VALVE

BACKGROUND OF THE INVENTION

The present invention relates to a solenoid valve which is arranged so as to form a switch by a valve and the associated valve seat.

In the prior art, for obtaining an electric signal indicating the open/close state of a valve unit, it is well known to use a valve unit in which an ON-OFF switch is constituted by a valve and the associated valve seat. Such a solenoid valve unit having a such a switch is needed, for example, for constituting a valve unit driving circuit in which the driving pulse applied to the valve unit is corrected in response to the timing of opening/closing of the valve unit in order to make the open/close timing of the valve unit coincide with a target timing. It is also needed for constituting a fuel injection valve which is capable of producing an electric signal indicating the injection timing of fuel.

As such a valve unit, there is disclosed for example in U.S. Pat. No. 4,111,178 (corresponding to DE-OS No. 2748447) a fuel injection valve in which a mechanical switch is constituted by a needle valve and a nozzle body in order to obtain an electric signal indicating the timing of the beginning of fuel injection and the timing of the end of fuel injection in response to the movement of the needle valve. In the disclosed fuel injection valve, a nozzle body and a needle valve smoothly moving in the guide hole of the nozzle body are formed of an electrically conductive material and the outer surface of the needle valve is covered with a ceramic insulation film of a thickness between approximately 0.2 $\mu$m and 0.3 $\mu$m, or an insulation film formed by the sputtering of aluminum oxide.

However, since the insulation layer of the conventional switch incorporated in the solenoid valve is formed only on the sliding surface of the valve member, it has the following disadvantages. Namely, although it is required for such a switch to maintain an open state during the open state of the valve, just after the opening of the valve or just before the closing of the valve, there is a possibility of the occurrence of an undesired electrical conducting state between the valve member and the associated stopper, whereby a noise signal is superposed on the desired signal derived from the switch. Consequently, in the case where the conventional switch is used, it is sometimes required to remove such an undesired signal by means of a complex signal processing circuit.

SUMMARY OF THE INVENTION

It is an object of the present invention to provide an improved solenoid valve having a switch constructed by a valve member and the associated valve seat.

It is another object of the present invention to provide a solenoid valve which is able to construct an ON-OFF switch which assumes the ON state only when the solenoid valve is in its closed state.

A solenoid valve according to the present invention has a valve member made of an electrically conductive material, an electrically conductive body having a guide hole for guiding the valve member slidably, a valve seat provided in said electrically conductive body, and an insulation layer formed on a sliding surface of the valve member for establishing an insulating condition between the sliding surface and a guide surface of the guide hole so as to construct a switch for electrically connecting the electrically conductive body with the valve member when the valve member is seated on the valve seat. The solenoid valve further comprises a solenoid actuator having a stator with an exciting coil and an armature fixed to the valve member, the solenoid actuator providing an electromagnetic force to seat the valve member on the valve seat, a spring means for biasing the valve member so as to separate from the valve seat at the time the solenoid actuator is in the de-energized state, a stopper which is connected to the valve member for setting the stroke of the valve member and coming into contact with the body when the solenoid actuator is in the de-energized state, and an insulating member provided between the stopper and the body so as to prevent the valve member for coming in contact with the body through the stopper.

When the solenoid actuator is de-energized, the valve member is urged by the spring means so as to open the solenoid valve and the stopper is made to come in contact with the body under pressure. However, since the electric insulating state between the valve member and the body is maintained by the insulating member, the switch formed by the valve member and the body is in the OFF state.

The switch is turned ON when the solenoid actuator is energized to move the valve member against the force of the spring means, whereby the valve member is seated on the associated valve seat. Then, the switch is turned OFF when the valve member separates from the associated valve seat by the de-energization of the solenoid actuator, and the valve member is returned and positioned at its closed position by the stopper. In this condition, since the state of electrical insulation state between the stopper and the body is maintained by the insulating member, the OFF condition of the switch is maintained.

As a result, the switch is ON only when the valve member is seated on the associated valve seat, and it is easy to obtain a signal indicating the open/close timing of the solenoid valve by use of the switch.

The invention will be better understood and other objects and advantages thereof will be more apparent from the following detailed description of preferred embodiments with reference to the accompanying drawings.

BRIEF DESCRIPTION OF THE DRAWINGS

FIG. 1 is an elevation partly in section showing an embodiment of a fuel injection pump having a solenoid valve according to the present invention;

FIG. 2A is a graph showing an ON/OFF state of the switch of the solenoid valve shown in FIG. 1; and FIG. 2B is a view showing a waveform of a signal produced by the switch.

DESCRIPTION OF THE PREFERRED EMBODIMENTS

FIG. 1 is a partially sectional view showing an embodiment of a solenoid valve 1 having an ON-OFF switch according to the present invention. The solenoid valve 1 may be used for adjusting the quantity of fuel injection of a fuel injection pump. The solenoid valve 1 has a stator 3 with an exciting coil 2 and a disc-like armature 4 made of a magnetic material located so as to face the lower surface 3*a* of the stator 3.

The armature 4 has a through-hole 4*a* at its center and the outer periphery portion thereof is bent away from the stator 3. A stopper 5 is secured on the lower surface 4*b* of the armature 4 and a nut member 6 is secured on the upper surface 4*c* of the armature 4. The stopper 5 and the nut member 6 are arranged in such a way that the through-hole 5*a* of the stopper 5 and the tapped hole 6*a* of the nut member 6 are aligned with the through hole 4*a*.

A supporting frame 7 is secured at the lower portion of the stator 3 and a cylindrical member 8 is secured in an opening 7*a* of the supporting frame 7. A valve guide member 10 having a guide hole 10*a* for slidably supporting and guiding a valve rod 9, is fitted into a hole 8*a* of the cylindrical member 8 and the valve guide member 10 is fixed in the cylindrical member 8 by a cap-like cover 35, which is screw engaged with the outer tapped surface of the cylindrical member 8.

The valve rod 9, which is supported and guided by the guide hole 10*a*, has an enlarged diameter portion 9*a* whose diameter is slightly smaller than the inner diameter of the guide hole 10*a* and an insulation layer 11 is formed on the outer surface 9*b* of the enlarged diameter portion 9*a* by depositing an appropriate insulation material thereon by a physical evaporating method such as a sputtering method, an ion-plating method or the like. As a result, the outer surface 9*b* is separated from contact with the guide surface of the guide hole 10*a* by the insulation layer 11, so that the insulating condition between the outer surface 9*b* and the inner surface of the guide hole 10*a* is assured during the movement of the valve rod 9. The inner diameter of the guide hole 10*a* is selected to be slightly larger than the outer diameter of the enlarged diameter portion 9*a* so as to accommodate the thickness of the insulation layer 11. Thus, the guide hole 10*a* is able to guide the valve rod 9 slidably in its axial direction while maintaining an oil tight condition between the guide hole 10*a* and the enlarged diameter portion 9*a* of the valve rod 9. A valve head 12 is integrally formed at the lower end portion of the valve rod 9 and a valve face 12*a* of the valve head 12 is able to come in oil-tight contact with a valve seat 13 formed at the lower end opening of the valve guide member 10.

A screw portion 9*c* configured for screw-engagement with the tapped hole 6*a* of the nut member 6 is integrally formed on the upper portion of the valve rod 9. The valve rod 9 is inserted into the through-hole 5*a* of the stopper 5 and the screw portion 9*c* is screwed into the tapped hole 6*a* to secure the armature 4 to the valve rod 9.

The nut member 6 is positioned in a space 14 defined at the center portion of the stator 3. One end portion of a coil spring 15 received in the space 14 contacts the nut member 6 and the other end portion of the coil spring 15 contacts an electrode assembly 16 secured to the stator 3.

The electrode assembly 16 has a spring shoe 19 and an electrode 18 which is electrically insulated by an insulating member 17, and an adjusting washer 20 for setting the force of the coil spring 15 is provided between the insulating member 17 and the stator 3. The adjusting washer 20, the insulating member 17, the electrode 18 and the spring shoe 19 are secured to the stator 3 by means of a bolt 21 and the associated nut 22.

As a result, the coil spring 15 operates between the electrode assembly 16 and the valve rod 9 so as to make the valve rod 9 move in the direction of arrow A, that is, to make the valve head 12 separate from the valve seat 13. Thus, when the exciting coil 2 is de-energized, the valve rod 9 moves in the direction of arrow A until the lower surface 5*b* of the stopper 5 comes in contact with the upper end surface 10*b* of the valve guide member 10, and the valve rod 9 is maintained in the state where the lower surface 5*b* is in contact with the upper end surface 10*b* of the valve guide member 10. Therefore, the magnitude of the gap between the armature 4 and the stator 3 can be easily adjusted by screwing the nut member 6 up and down on the screw portion 9*c* of the valve rod 9.

In order to establish electrical contact between the valve rod 9 and the valve guide member 10 only when the valve head 12 of the valve rod 9 is seated on the valve seat 13, an insulating sheet 23 made of an insulation material such a high-performance plastic or ceramic is provided on the upper end surface of the valve guide member 10, so that the lower surface 5*b* of the stopper 5 is separated from the upper end surface 10*b* of the valve guide member 10 by the insulating sheet 23. Consequently, a switch 30 formed by the valve rod 9 and the valve seat 13 is maintained in the OFF state when the solenoid valve 1 is open.

Furthermore, in this embodiment, an annular insulating sheet 24 is provided on the upper surface 4*c* of the armature 4 so that electrical contact between the armature 4 and the stator 3 can be effectively prevented even if the armature 4 should incline. That is, although the armature 4 is adjusted so as to maintain a gap of predetermined magnitude between the armature 4 and the stator 3 even when the armature 4 is attracted toward the stator 3 by the energization of the exciting coil 2, the gap is extremely small so that the peripheral portion of the armature 4 may come in contact with the stator 3 when the armature 4 inclines. However, the insulating sheet 24 maintains the electrical insulating condition between the armature 4 and the stator 3 even when the armature 4 inclines, so that it is assured that the switch constructed between the valve rod 9 and the valve seat 13 is turned ON even in such a case.

Since the armature 4, the spring shoe 19, the coil spring 15, the nut member 6 and the electrode 18 are all made of an electrically conductive material, the valve rod 9 is always electrically connected through these members to the electrode 18, which is electrically connected with an exterior circuit through a wire (not shown).

To prevent any fluid or gas leaking from the gap between the guide hole 10*a* and the valve rod 9 from reaching the side of the stator 3, the solenoid valve 1 has a sealing member 32 provided in a chamber 31 which is defined by enlarging the upper portion of the guide hole 10*a* of the valve guide member 10. As shown, the sealing member 32 is in pressure contact with the peripheral surface of the valve rod 9 and the inner surface of the chamber 31 so as to maintain oil-tight condition. Thus, any fluid or gas leaking through the gap between the valve rod 9 and the guide hole 10*a* is recovered through a fuel passage 33 defined in the valve guide member 10 and is thus prevented from reaching the side of the stator 3.

The operation of the solenoid valve 1 shown in FIG. 1 will now be described with reference to FIGS. 2A and 2B.

Since the valve rod 9 descends under the force of the coil spring 15 when the exciting coil 2 is not excited, the valve head 12 is kept separated from the associated valve seat 13 so that the solenoid valve 1 is in its opened state. As the insulation layer 11 is provided on the outer surface 9*b* of the large diameter portion 9*a* of the valve rod 9 and the insulating sheet 23 is provided between the stopper 5 and the valve guide member 10, a condition of electric insulation is established between the valve rod 9 and the valve guide member 10 so that an electrically non-conductive state is established between the electrode 18 and the valve guide member 10. This condition corresponds to the state before $t=t_o$ shown in FIG. 2 and the switch 30 constituted by the valve rod 9 and the valve guide member 10 is in its OFF state.

When the exciting coil 2 is energized at $t=t_o$, the armature 4 is attracted to the stator 3 so that the valve rod 9 start to move in the opposite direction to arrow A. Thus, the valve head 12 is seated on the associated valve seat 13 at $t=t_1$ to completely close the solenoid valve 1. At this time, the switch 30 assumes its closed state. At this time, although the armature 4 comes close to the stator 3, there is no danger of an electric conducting state being established therebetween thanks to the presence of the insulating sheet 24.

When the exciting coil 2 is de-energized at $t=t_2$, the valve rod 9 start to move in the direction shown by arrow A under the force of the coil spring 15. As a result, the electric conducting state between the valve rod 9 and the valve guide member 10 is released immediately, so that the switch 30 assumes its OFF state. After this, the stopper 5 comes in contact with the valve guide member 10 at $t=t_3$ and the solenoid valve 1 is completely opened.

Because of the insulating sheet 23, the switch 30 of the solenoid valve 1 according to the present invention is, as shown in FIG. 2B, in its ON state only when the valve head 12 of the valve rod 9 is seated on the valve seat 13, while the conventional switch assumes the ON state even before $t=t_o$ and remains in this state even after $t=t_3$ as shown by the dot-dash line in FIG. 2B. Consequently, according to the switch of the solenoid valve 1, it is easy to determine the time of the beginning of valve opening and the time of the beginning of valve closing on the basis of the signal from the switch, without the use of a complex signal processing circuit.

It should be noted that the insulating sheets 23 and 24 may be made of a polyimide, a polyethyleneterephthalate or the like. Furthermore, the insulating sheet 23 may be provided on the stopper 5 and the insulating sheet 24 may be provided on the lower surface 3*a* of the stator 3.

We claim:

1. A solenoid valve comprising:
   - a valve member made of an electrically conductive material;
   - an electrically conductive body having a guide hole for guiding said valve member slidably;
   - a valve seat provided in said electrically conductive body;
   - an insulation layer formed on a sliding surface of said valve member for establishing an insulating condition between the sliding surface and a guide surface of the guide hole so as to construct a switch for electrically connecting said electrically conductive body with said valve member when said valve member is seated on said valve seat;
   - a solenoid actuator having a stator with an exciting coil and an armature fixed to said valve member, said solenoid actuator providing an electromagnetic force to seat said valve member on said valve seat;
   - a spring means for biasing said valve member to separate from said valve seat at the time said solenoid actuator is in the de-energized state;
   - a stopper which is connected to said valve member for setting the stroke of said valve member and comes in contact with said body when said solenoid actuator is in the de-energized state; and
   - an insulating member provided between said stopper and said body so as to prevent said valve member from coming in contact with said body through said stopper.

2. A solenoid valve as claimed in claim 1 wherein said insulating member is provided on the surface of said body opposite to said stopper.

3. A solenoid valve as claimed in claim 1 wherein said insulating member is provided on the surface of said stopper opposite to said body.

4. A solenoid valve as claimed in claim 1 wherein said insulating member is made of ceramic.

5. A solenoid valve as claimed in claim 1 wherein said insulating member is made of high performance plastic.

6. A solenoid valve as claimed in claim 1, further comprising other insulating member for preventing said armature from being electrically connecting with the stator, said other insulating member being located between said armature and said stator.

7. A solenoid valve as claimed in claim 6 wherein said other insulating member is an insulating sheet provided on the surface of said armature opposite to the stator.

8. A solenoid valve as claimed in claim 1, further comprising a sealing member positioned between said valve member and said body for preventing fluid leaking from the gap between said valve member and the guide hole from flowing toward said solenoid actuator.

* * * * *